(12) United States Patent
Patel

(10) Patent No.: US 9,077,863 B2
(45) Date of Patent: Jul. 7, 2015

(54) SYSTEM AND METHOD FOR MANAGING LOCATION BASED VIDEO SERVICES

(75) Inventor: Dharmesh V Patel, Monmouth Junction, NJ (US)

(73) Assignee: NICE SYSTEMS LTD., Ra'anana (IL)

( * ) Notice: Subject to any disclaimer, the term of this patent is extended or adjusted under 35 U.S.C. 154(b) by 1569 days.

(21) Appl. No.: 11/868,800

(22) Filed: Oct. 8, 2007

(65) Prior Publication Data

US 2009/0094649 A1   Apr. 9, 2009

(51) Int. Cl.
*H04N 7/18* (2006.01)
*G08B 13/196* (2006.01)
*H04N 21/258* (2011.01)
*H04N 21/2668* (2011.01)
*H04N 21/414* (2011.01)
*H04N 21/442* (2011.01)
*H04N 21/61* (2011.01)
*H04N 21/658* (2011.01)

(52) U.S. Cl.
CPC .......... *H04N 7/181* (2013.01); *G08B 13/19641* (2013.01); *G08B 13/19691* (2013.01); *H04N 21/25841* (2013.01); *H04N 21/2668* (2013.01); *H04N 21/41407* (2013.01); *H04N 21/442* (2013.01); *H04N 21/6131* (2013.01); *H04N 21/6181* (2013.01); *H04N 21/6582* (2013.01)

(58) Field of Classification Search
USPC .................................................. 348/158, 159
See application file for complete search history.

(56) References Cited

U.S. PATENT DOCUMENTS

| | | | |
|---|---|---|---|
| 7,872,593 B1 * | 1/2011 | Rauscher et al. | 348/143 |
| 2006/0269104 A1 * | 11/2006 | Ciolli | 382/104 |
| 2006/0270421 A1 * | 11/2006 | Phillips et al. | 455/457 |
| 2007/0070185 A1 * | 3/2007 | Dy et al. | 348/14.03 |
| 2008/0077596 A1 * | 3/2008 | Patton et al. | 707/10 |
| 2008/0084473 A1 * | 4/2008 | Romanowich | 348/135 |
| 2008/0139222 A1 * | 6/2008 | Falvo et al. | 455/456.3 |
| 2008/0153512 A1 * | 6/2008 | Kale et al. | 455/456.3 |
| 2009/0015672 A1 * | 1/2009 | Clapp | 348/143 |

* cited by examiner

*Primary Examiner* — Melvin H Pollack
(74) *Attorney, Agent, or Firm* — Pearl Cohen Zedek Latzer Baratz LLP

(57) ABSTRACT

System and method for management of location based video services may allow a management server to receive information such as geographical location, from one or more mobile devices and to transfer data, such as video data or other multi-media data, from a plurality of cameras or other media sources to the mobile devices based on the received information.

27 Claims, 2 Drawing Sheets

SYSTEM AND METHOD FOR MANAGING LOCATION BASED VIDEO SERVICES

BACKGROUND

Video cameras are becoming more prevalent throughout major cities, large campuses, and corporate facilities. Thousands of video cameras may be distributed throughout a wide geographical area and a large number of mobile users such as first responders, namely, policemen, firefighters, security personnel, and the like might need to access the recorded video data. As camera counts increase, the demand for the video data also increases. Typically, video data and associated information are not easily available. Traditionally, video is monitored in central stations and relevant incident information is dispatched over radio to the first responders. There is a growing need, for practical, logistical, and economical reasons, to have video transmitted to users, such as, field personnel using mobile devices.

Current technologies allow mobile users to view video using a manual process, e.g., a user has to search through a large list of cameras before making a selection. Such process may take up valuable time, especially when real-time analysis of critical situations may be required. The need for an efficient solution to automatically get the right video to the right person at the right location at the right time is highly required.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
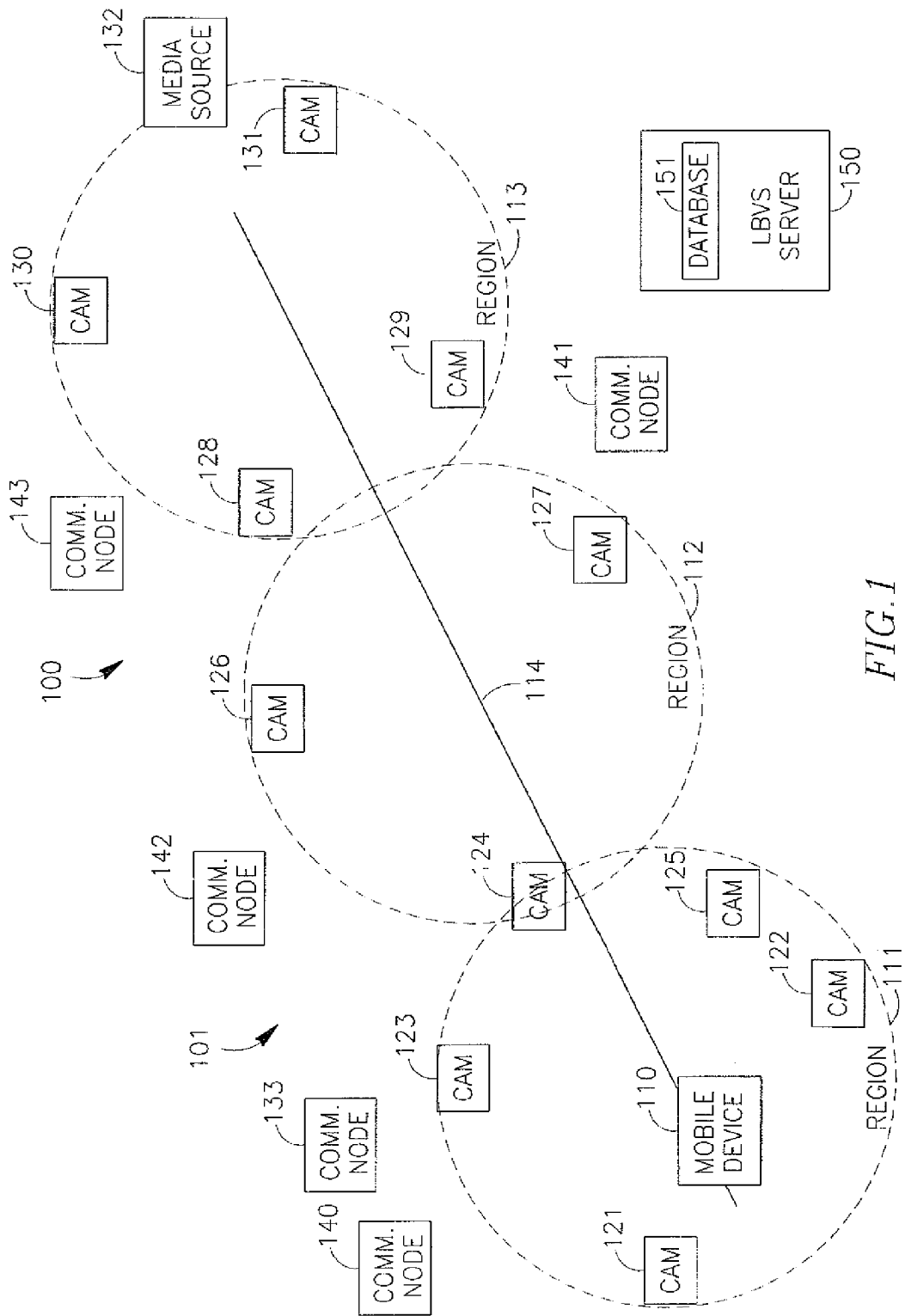
FIG. 1 is a high-level block diagram of a portion of a location based video services management system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification and claims to describe two or more components, devices, elements, units, parameters, or the like. For example, "a plurality of devices" may include two or more devices.

Although embodiments of the invention are not limited in this regard, the terms "communication session" and "data" as used herein may be used throughout the specification and claims to describe any media or multi-media data, such as audio data, video data, screen capture data, textual data or any other media or multi-media data which may be transferred between two or more devices via a communication network.

Although embodiments of the invention are not limited in this regard, the term "mobile device" as used herein may be used throughout the specification and claims to describe any computing device which may be used in environments where using a conventional computer would not be practical. A mobile device may comprise input and output interfaces, such as a visual display screen for user output and a keyboard or a touch screen for user input. A non exhaustive list of mobile devices may include personal digital assistants (PDAs), laptops, smart phones, mobile game consoles, pagers or any other mobile device.

Although embodiments of the invention are not limited in this regard, the term "camera" as used herein may be used throughout the specification and claims to describe any device or component able to capture and/or record any type of data, such as, video data, still images data, audio data and the like.

Although embodiments of the invention are not limited in this regard, the term "media source" as used herein may be used throughout the specification and claims to describe any source of information such as a server, a database, a computer, a station, a mobile device or other source of information or data which may be able to transmit and/or receive data to and/or from components or devices in a communication environment.

Although embodiments of the invention are not limited in this regard, the term "communication network" as used herein may be used throughout the specification and claims to describe any wireless or wired network communication network such as, a Local Area Network (LAN), a Wireless LAN (WLAN), a Metropolitan Area Network (MAN), a Wireless MAN (WMAN), a Wide Area Network (WAN), a Wireless WAN (WWAN) and networks operating in accordance with existing IEEE 802.11, 80.211a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards.

Some embodiments of the invention may be implemented, for example, using a machine-readable medium or article which may store an instruction or a set of instructions that, if executed by a machine (for example, by a computer, a mobile device and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Video Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Embodiments of the present invention may enable a management server to receive information such as geographical location, from one or more mobile devices and to transfer data, such as video data or other multi-media data, from a plurality of cameras or other media sources to the mobile devices based on the received information.

Reference is now made to FIG. 1, which is a high-level block diagram of a portion of a location based video services (LBVS) system according to embodiments of the present invention. Although the scope of the present invention is not limited in this respect, LBVS system 100 may include a plurality of cameras 121, 122, 123, 124, 125, 126, 127, 128, 129, 130, 131 and a plurality of media sources 132 and 133, all capable of transferring data via a plurality of communication nodes 140, 141, 142 and 143 to one or more mobile devices 110 and one or more location based video services (LBVS) servers 150, also referred to herein as "management server".

Although in the exemplary illustration of FIG. 1, eleven cameras, two media sources, four communication nodes, one mobile device and one management server are shown, it should be understood to a person skilled in art that the invention is not limited in this respect and according to embodiments of the present invention, LBVS system 100 may include any suitable numbers of cameras, media sources, communication nodes, mobile devices and management or LBVS servers.

LBVS system 100 may use communication network 101 to enable network connectivity between LBVS server 150, cameras 121-131 and media sources 132-133 via communication nodes 140-143. Communication network 101 may include a plurality of areas, cells or regions 111, 112 and 113. Each region may include or may be associated with a plurality of cameras, media sources and communication nodes located in or in proximity to the region. For example, in the exemplary illustration of FIG. 1, region 111 may include cameras 121-125, communication node 140 and media source 133; region 112 may include cameras 124-127 and 129 and communication nodes 141-142; and region 113 may include cameras 128-131, communication node 143 and media source 132. It should be understood to a person skilled in the art that one or more cameras, media sources and communication nodes may be associated with more than one region; for example, camera 124 may be associated with region 111 and/or region 112.

According to some embodiments of the present invention, mobile device 110 may pass through one or more regions, for example, mobile device 110 may travel on route 114 which may pass through regions 111, 112 and 113. Mobile device 110 may receive and send data via communication nodes associated with a region in which mobile device 110 is located at a certain time. The data transfer to and from mobile device 110 may be managed, controlled and/or supervised by LBVS server 150 as described in detail below with reference to embodiments of the present invention.

According to some embodiments of the invention, LVBS server 150 may provide management capabilities to the system. Such management capabilities may include automated management including transferring live or play-back data to mobile device 110 based upon the physical location of mobile device 110. The data transmission may be performed using any wireless communication technologies used to transfer communication sessions. Types of wireless communication technologies intended to be within the scope of the present invention include, although are not limited to, 802.11x, 3G cellular, WiiMax, Canopy/Mesh networks, Bluetooth, and the like. Other communication technologies may be used.

LBVS server 150 may manage, control and filter data to be transferred to mobile device 110 by tracking the location of mobile device 110 in real-time, associating relevant cameras and media sources, e g., cameras located in proximity to mobile device 110 and transferring relevant data from the associated cameras and media sources to mobile device 110. The management may be performed using, for example, software implemented and executed by server 150 and/or by mobile device 110. The mobile device and/or software implemented on mobile device 110 are also referred to herein as "LBVS client".

The position of mobile device 110 may be calculated by using any technology or method known in the art, for example, using Global Positioning System (GPS), Radio-frequency identification (RFID), triangulation between antennas, or by data packet. Although the scope of the invention is not limited in the respect, data related to the position of mobile device 110 may be relayed to LBVS server 150 from LBVS client and may be processed by the LBVS software. The processing may include calculating the position of mobile device 110 in real-time and correlating the calculated position to relevant data from cameras 121-131, media sources 132-133 and/or other resources or relevant information saved in LBVS server.

According to some embodiments of the invention, LBVS server 150 may dynamically track mobile device 110 and its respective user or users which are logged on to LBVS system 100. For example, LBVS client software may be initiated on mobile device 110. Based on the location of mobile device 110 and the logged on user's rights and privileges, LBVS server 150 may associate and send data from one or more cameras 121-131 and media sources 132-133 to mobile device 110 as described in detail below. For example, LBVS server 150 may send real-time data and play-back data such as video streams, corresponding alarm information and/or audio data from camera 125 and media source 133 to mobile device 110 when located, for example in region 111.

According to some embodiments of the invention, as mobile device 110 roams between geographical locations, regions or physical wireless nodes, for example from region 111 to region 112, the cameras and media sources associate with the mobile device may be changed dynamically. Accordingly, upon moving from region 111 to region 112, mobile device 110 may receive data from different cameras. For example, the video layout on the screen of mobile device 110 may be dynamically changed and may include real-time video streams and/or text based alarm information specific to the current physical location, such as general statuses, intelligent video triggers, and manually activated triggers which may be relayed to mobile device 110 in real-time.

According to some embodiments of the invention, LBVS system 100 may identify a critical situation or incident, for example, an abandoned package, a criminal event, a fire and the like. The critical situation may be detected, for example, by video analytics of LBVS server 150, LBVS client software, one of cameras 121-131 or one of media sources 132-133. If the detection is not performed by LBVS server 150, the critical situation identification may be transferred to LBVS server 150, for example, in real-time. LBVS server 150 may automatically find the mobile device which is closest to the location of the situation and/or has the appropriate credentials who is equipped to respond to this particular situation. LBVS server 150 may transmit live and/or playback video from the closest camera(s) to the mobile device and may send additional information generated by LBVS server 150, for example, highlighted information, such as, highlighting of a suspect object or the area of interest in question. Such combination of real-time and playback video data in addition to other relevant information may automatically provide a mobile user "situational awareness", namely a great knowledge, familiarity and understanding of a certain situation.

Although the scope of the invention is not limited in this respect, in addition to video data and audio data, LBVS server 150 may also send other relevant information such as, a list of adjacent cameras, a map of the event location, vicinity of other first responders, and standard operational procedure. Such information may be retrieved from a database 151 coupled to or located within LBVS server 150 or other sources, for example, media sources 132-133.

Database 151 may be used for storing any data, communication session or information related to location based video services management, for example the information on users logged on to LBVS system 100, location of mobile devices 110, processed video data or any other suitable information. Database 151 may be placed at any suitable memory units or storage medium. In some embodiments of the present invention, database 151 may be located inside LBVS server 150 while in other embodiments, database 151 may be located outside LBVS server 150.

In embodiments of the present invention, the database 151 may include any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Video Disks (DVDs), a tape, a cassette, or the like.

According to some embodiments of the invention, LBVS server 150 may send data in a non-automated form. For example, if a human operator in a certain location, such as supervision station or police central station detects a suspicious incident on one of cameras 121-131, the operator may manually push the video to mobile device 110 for on-site analysis.

According to some embodiments of the invention, mobile device 110 may act as an additional portable or mobile camera. For example, after arriving to an incident location and assessing the situation, mobile device 110 may be used to send data from the scene to LBVS server 150 or to other mobile devices, for example, a video and/or audio data of the scene, as well as status reports and/or additional information on the incident. All collected data and multimedia information from mobile device 110 may be wirelessly uploaded to database 151 of LBVS server 150 where it may be processed and organized, for example, by time-line, geographic location or other criteria. This data may be processed in real-time and may be instantly available for distribution to other mobile devices and central monitoring stations.

According to some embodiments of the invention, LBVS system 100 may track, for example, by LBVS server software, mobile device 110 and may calculate its trajectory, for example, on route 114, by known in the art intelligent algorithms. As a result, LBVS system 100 may be able to dynamically generate an anticipated data for the adjacent physical sites on route 114 which may be cued and dynamically transferred to mobile device 110 traveling on route 114 at any speed.

For example, a police vehicle having a mobile device is patrolling the city streets in search of a suspect wearing a red jacket. LBVS system 100 may know the location of the police vehicle and the direction it's headed based on mobile device's information. LBVS server 150 may initiate, for example, a color filtering video algorithm on both the live and playback video on the cameras in the vicinity of the moving police vehicle to isolate the location(s) of the potential suspect. Only videos from cameras where a person is wearing red is detected are automatically transmitted to the mobile device in the police vehicle.

According to some embodiments of the invention, LBVS system 100 may also guide a mobile device, e.g., mobile device 110, for example, the mobile device in the police vehicle, in real-time, using the best possible route to the location of a suspect. The video layout in the mobile device may dynamically change as it moves through the streets.

Figure 2:
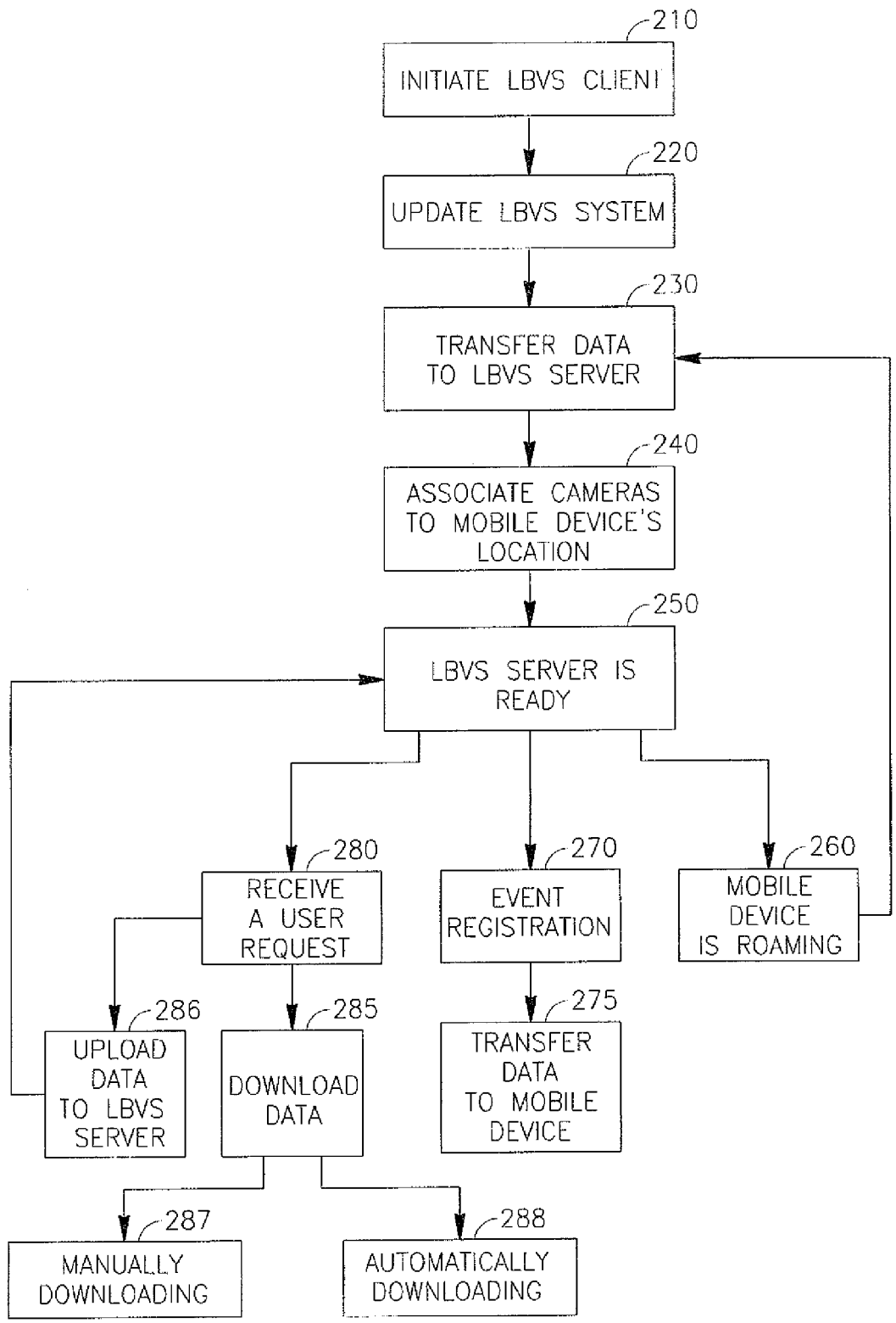
FIG. 2 is a flowchart of a method for management of location based video services according to embodiments of the present invention.

Reference is now made to FIG. 2, which is a flowchart of a method for managing location based video services according to embodiments of the present invention. Operations of the method may be implemented, for example, using system 100, by one or more of the elements in LBVS system 100, namely, cameras 121-131, mobile device(s) 110, media sources 132-133, LBVS server 150 and communication nodes 140-143 and/or by other suitable units, devices, and/or systems.

As indicated at box 210, the method may include initiating an LBVS client, e.g., initiating an LBVS client software, on a mobile device, for example, mobile device 110. Initiating the LBVS client may include logging in or registration of a user to the LBVS system, for example, insertion of user's details and information such as profile, identification and credentials to the LBVS client and transferring data related to user, such as user's details, logging in time and the like to the LBVS server, for example, server 150. It should be understood to a person skilled in the art that initiating the LBVS client on a mobile device may include any other suitable steps, operations or sets of operations.

As indicated at box 220, the method may include updating the LBVS system by the LBVS server based on the user's related data. Updating may include registration of a user of a mobile device to its active database by the LBVS server. The active database may include, for example, a plurality of cameras, media sources or other data resources which may be used by the user operating the mobile device. For example, data resources which the user is allowed to use, cameras and media sources which located in proximity to the mobile device location, cameras and media sources which located in or associated with the region in which the mobile device is located in and the like. Any other suitable steps, operations or sets of operations may be used in updating the LBVS system.

As indicated at box 230, the method may include sending or transferring data, information or details from the LBVS client to the LBVS server. The transferred data may include any current geo-spatial data or information of the LBVS client such as location based information, coordinate points, geographical reference points and the like. The information received from the LBVS client, also referred to herein as the mobile device, may be stored in a general or dedicated storage medium of the LBVS server, for example, in database 151. The method may further include continuously and dynamically updating the stored information and geo-spatial data in real-time while receiving updated information and geo-spatial data from the LBVS client. For example, a mobile device may roam from one location to another location and thereby its parameters, information and geo-spatial data may be changed. In such an exemplary situation, the LBVS client running on the mobile device may transfer its new parameters and geo-spatial data and the stored information may be dynamically updated.

As indicated at box 240, the method may include dynamically analyzing by the LBVS server data received from the LBVS client and associating video sources, media sources or other data resources which located in proximity to the current location of the mobile device. Analyzing the data may include, processing the data received from the mobile device and calculating the current position or location of the mobile device. Associating sources may include dynamically correlating in real-time cameras, media sources and other resources to the current position of the mobile device or the profile of the mobile device's user as provided to the LBVS server by the LBVS client. For example, a mobile device may roam from one location to another location and thereby the camera and media sources associated with its current location may be changed as described below with reference to box 280.

As indicated at box 250, the LBVS server may be ready to receive and transmit multi-media data to or from mobile device, e.g., while dynamically updating geo-spatial data received from the LBVS client and associating the current relevant media sources, as indicated at boxes 230 and 240.

As indicated at box 260, the mobile device may roam to another geographical area, for example, mobile device 110 may roam from region 111 to region 112 (of FIG. 1). If a mobile device roams, the method may include sending or transferring current geo-spatial data from the LBVS client to the LBVS server.

As indicated at box 270, an event or situation, such as an alarm, a report, a call or the like may be registered to the LBVS server. For example, a report may be received by the LBVS server from a police station or Safekeeping Company, firefighter's station and the like. Such an event registration may be followed by sending or transferring data, such as video data or situational data by the LBVS server to one or a plurality of mobile devices which are relatively close to the event scene as indicated in box 275.

As indicated at box 280, a user request may be received at the mobile device, a user request may include upload data request as indicated at box 286 or download data request as indicated at box 285.

As indicated at box 286, the method may include uploading data, such as video data or situational data to the LBVS server. For example, the first responder to an event may use his mobile device to record video and/or audio of the event. Such a recording may be uploaded to the LBVS server by the LBVS client. The LBVS server may update its database with the uploaded data as indicated at box 250. The data uploaded by the LBVS client may be further transferred by the LBVS server to other users or mobile devices, being the most updated data related to the specific event.

As indicated at box 285, the method may include downloading data such as video data or other situational data. The downloading may be performed automatically as indicated at box 288 or manually as indicated at box 287.

As indicated at box 288, the method may include automatically downloading or transferring of multi-media data to a mobile device according to or based on the information, properties or data related to the mobile device, for example, based on the profile of the user of the mobile device and/or geographical location of the mobile device. The automatic transfer of data may be controlled and managed by the LBVS server, for example, LBVS server 150. The data being transferred may be downloaded from the LBVS server or from one of the cameras, media sources or other data resources which may be associated with the mobile device as indicated by box 240.

As indicated at box 287, the method may include manually downloading or transferring of multi-media data to a mobile device according to or based on a specific request, information or details registered to the mobile device by its user. For example, a police man may request to receive to its mobile device data which may be helpful in analyzing a situation. The transfer of data may be controlled and managed by the LBVS server, for example, LBVS server 150. The data being transferred may be downloaded from the LBVS server or from one of the cameras, media sources or other data resources which may be associated with the mobile device as indicated by box 240.

It should be understood to a person skilled in the art that other operations or sets of operations may be used in accordance with embodiments of the invention.

Although the scope of the invention is not limited in this respect, embodiments of the present invention may include an entire course of action, for example, from a suspect identification to incident resolution, virtually hands-free. Such embodiments may provide safety benefits to the user while leveraging existing technologies, such as camera networks to provide location based awareness of the surrounding environment.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for managing location based video services, the method comprising:
   receiving real-time location information from a plurality of mobile devices;
   associating with the each of the plurality of mobile devices, based on the real-time location information, one or more cameras located in proximity to a location of the mobile device, the cameras capable of transferring data in real-time to the mobile device, and changing the association dynamically as each mobile device roams between geographical locations;
   storing playback video data from the one or more cameras on a server;
   locating based on the real time location information and based on information related to an event, the mobile device closest to the location of the event;
   automatically transferring, based on a profile of a user associated with the mobile device and the location of the mobile device, relevant playback video data from said one or more cameras via the server to said located mobile device, wherein the playback video data includes highlighting of an object or area of interest; and dynamically changing a video layout on a screen of the mobile device based on the location of the mobile device.

2. The method of claim 1 comprising:

storing the real-time location information;

dynamically updating the stored real-time location information;

dynamically associating, based on the updated location information, at least one additional camera, located in proximity to a location of at least one of the plurality of mobile devices, capable of transferring data in real-time to the at least one mobile device.

3. The method of claim 1, comprising transferring real-time video data from one or more cameras.

4. The method of claim 1, wherein transferring video data to the located mobile device comprises transferring play-back video data from one or more cameras based on the location information.

5. The method of claim 1, further comprising:

transferring data related to the content of the video data to the located mobile device.

6. The method of claim 1 comprising:

calculating the real-time location information by using Global Positioning System (GPS) application or Radio-frequency identification (RFID) application.

7. The method of claim 1, wherein transferring video data comprises transferring data based on a request from a user of the located mobile device.

8. The method of claim 1, wherein the mobile devices comprises a mobile cameras.

9. The method of claim 8 comprising:

transferring video data from the located mobile camera to other mobile devices.

10. The method of claim 1, wherein the video comprises highlighted information.

11. The method of claim 10, wherein the highlighted information comprises an abandoned package.

12. The method of claim 5, wherein transferring data related to the content of the video data comprises transferring data from a plurality of media sources.

13. The method of claim 5, wherein the data related to the content of the video comprises a best route to a scene.

14. The method of claim 1, wherein the plurality of mobile devices comprises smart phones.

15. A location based video management system comprising:

a plurality of cameras;

a plurality of mobile devices; and a management server to:

receive real-time location information from the plurality of mobile devices;

associate, with each of the plurality of mobile devices, one or more cameras, located in proximity to a location of the mobile device, wherein the cameras are capable of automatically transferring video data to said mobile device;

change the association dynamically as each mobile device roams between geographical locations;

store playback video data from the one or more cameras on a server;

based on the real-time location information locate the mobile device closest to a specific location;

send video data previously recorded by at least some of the cameras to the located mobile device; and dynamically change a video layout on a screen of the mobile device based on the location of the mobile device.

16. The system of claim 15, wherein the management server is to store the real-time location information and to dynamically update the stored real-time location information.

17. The system of claim 15, wherein the video data comprises real-time video data from one or more cameras.

18. The system of claim 15, wherein the management server is to transfer data related to the content of the video data to the located mobile device.

19. The system of claim 15, wherein the management server is to calculate the real-time location information by using Global Positioning System (GPS) application or Radio-frequency identification (RFID) application.

20. The system of claim 18, comprising a plurality of media sources to transfer the data related to the content of the video to mobile devices.

21. The system of claim 15, comprising a database to store the profiles of the users associated with the plurality of mobile devices.

22. The system of claim 15, wherein the mobile devices comprise mobile cameras.

23. The system of claim 22, wherein the located mobile device is to transfer video data to other mobile devices.

24. The system of claim 15, wherein the system is being used in security applications, first responder applications or emergency applications.

25. The method of claim 1 further comprising, following an event, transferring from the server to the mobile device situational data relating to the event.

26. The method of claim 1 further comprising dynamically changing the video layout on the screen of the mobile device to include one or both of real-time video streams and text based alarm information specific to the current physical location of the mobile device.

27. The method of claim 1 wherein the automatically transferring is further based on the rights and privileges of the user associated with the mobile device.

* * * * *